S. L. SLAUGHTER.
AUTOMOBILE TRANSMISSION MECHANISM.
APPLICATION FILED FEB. 16, 1912.
1,051,281.
Patented Jan. 21, 1913.
3 SHEETS—SHEET 2.
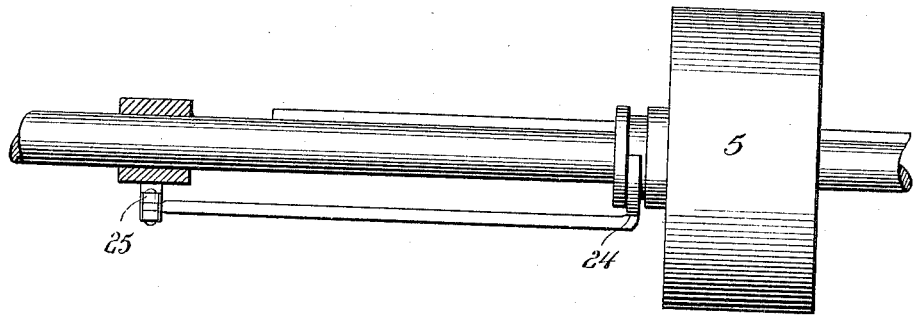
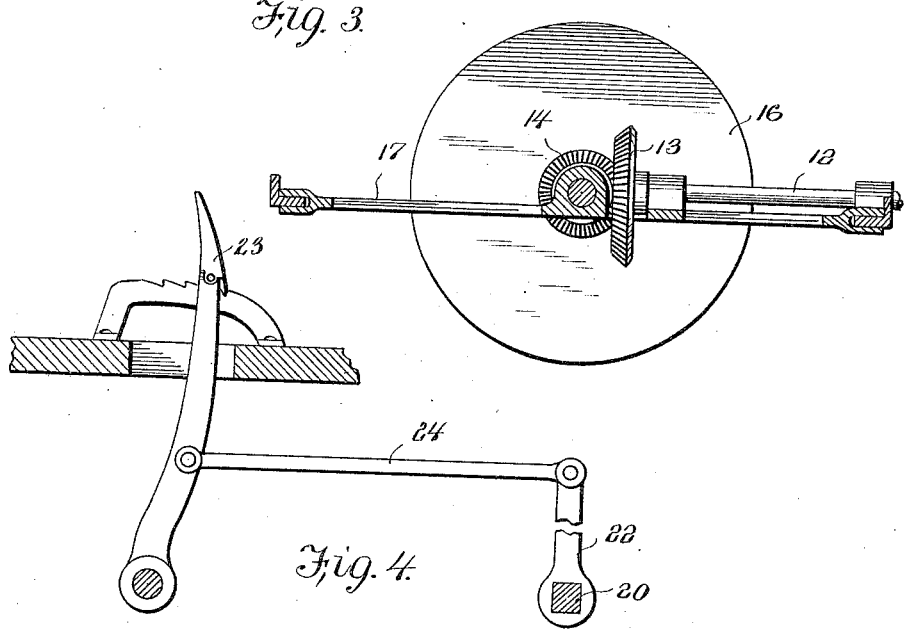
Witnesses
William R Smith.
U. B. Hillyard.
Inventor
Samuel L. Slaughter.
By Victor J. Evans
Attorney S. L. SLAUGHTER.
AUTOMOBILE TRANSMISSION MECHANISM.
APPLICATION FILED FEB. 16, 1912.
1,051,281.
Patented Jan. 21, 1913.
3 SHEETS—SHEET 3.
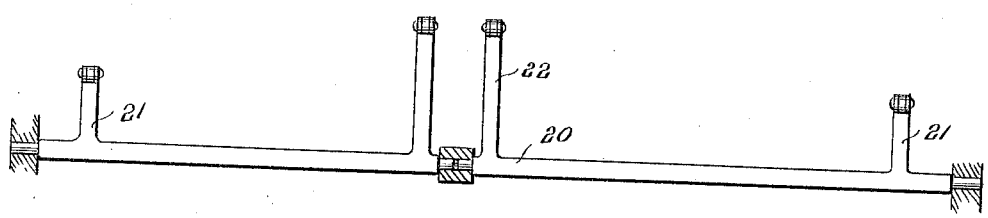
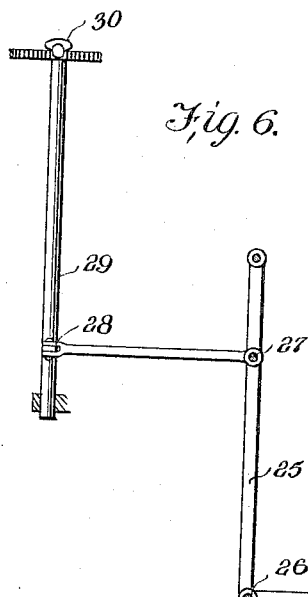
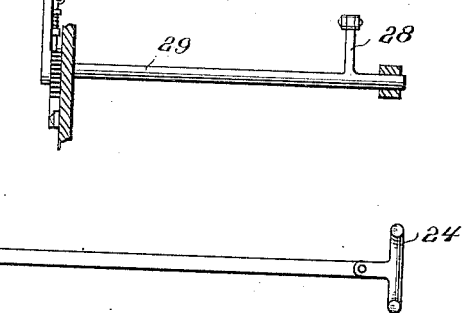

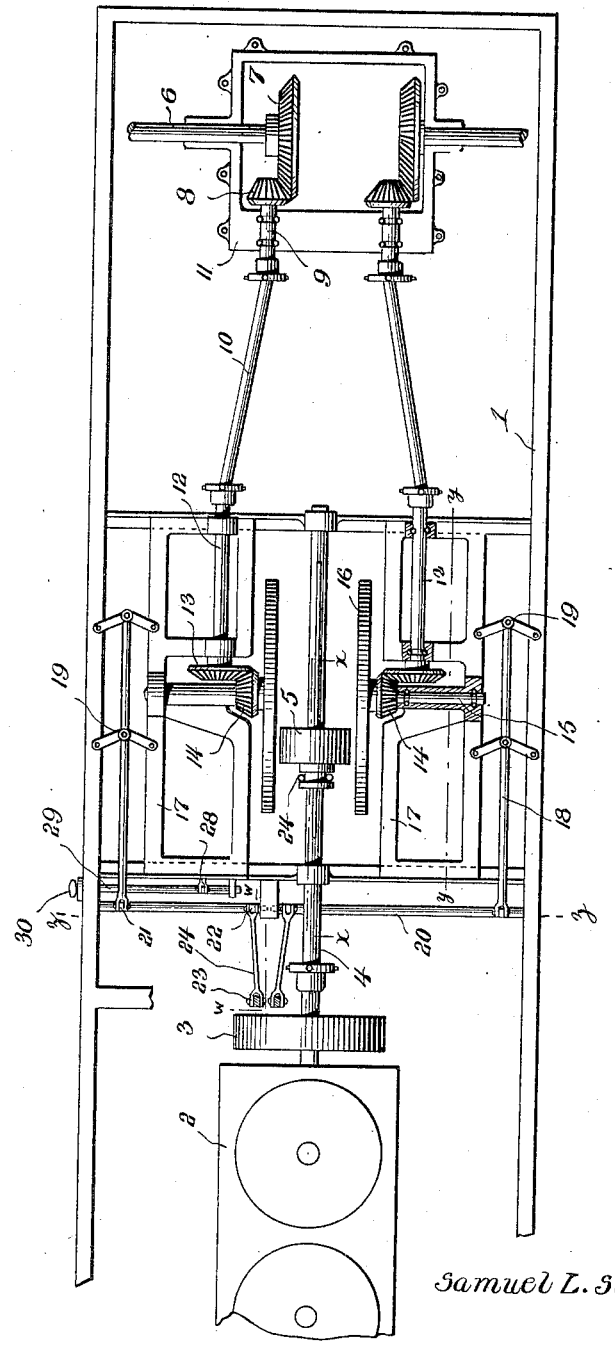

UNITED STATES PATENT OFFICE.

SAMUEL L. SLAUGHTER, OF RICHMOND, MISSOURI.

AUTOMOBILE TRANSMISSION MECHANISM.

1,051,281.  Specification of Letters Patent.  Patented Jan. 21, 1913.

Application filed February 16, 1912. Serial No. 677,927.

*To all whom it may concern:*

Be it known that I, SAMUEL L. SLAUGHTER, a citizen of the United States, residing at Richmond, in the county of Ray and State of Missouri, have invented new and useful Improvements in Automobile Transmission Mechanism, of which the following is a specification.

The present invention provides a combined friction and cog gear drive for mechanically propelled vehicles which enables the speed to be changed at the will of the driver without necessitating the shifting of the clutch or the shifting of gears, the arrangement of the parts being such as to admit of any desired speed being obtained by the single operation of one lever.

The invention contemplates two friction disks and one friction wheel, the latter being keyed upon the drive shaft and slidable thereon between the friction disks, two power transmitting shafts being connected with the friction disks by means of cog gearing and to the sections or members of the axle in a like manner, that is by means of cog gearing so as to insure a positive drive with no chance of slipping.

The invention further contemplates novel mountings for the friction disks and actuating means whereby the mountings may be moved in unison or separately according to the result to be attained.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of the chassis of a mechanically propelled vehicle of the automobile type provided with drive mechanism embodying the invention. Fig. 2 is a section on the line $x$—$x$ of Fig. 1. Fig. 3 is a section on the line $y$—$y$ of Fig. 1. Fig. 4 is a section on the line $w$—$w$ of Fig. 1. Fig. 5 is an enlarged section on the line $z$—$z$ of Fig. 1. Fig. 6 is a detail view of the means for operating the friction wheel. Fig. 7 is a front view of the operating lever and the rock shaft supporting the same.

Corresponding and like parts are referred to in the following description, and indicated in all the views of the drawings, by the same reference characters.

The framework of the machine is indicated at 1 and may be of any design best adapted for supporting the working parts. The engine 2 may be of any make or type. The fly wheel 3 is mounted upon the engine shaft. The drive shaft 4 is connected with the engine shaft by means of a universal coupling and receives a friction wheel 5 which is keyed thereon in any manner to rotate therewith but free to slide on the said drive shaft. The rear or drive axle comprises similar members 6 each provided at or near its inner end with a bevel cog wheel 7, which is in mesh with a bevel pinion 8 secured to the rear end of a shaft 9, which is connected to a shaft 10 by means of a universal coupling. The shafts 9 and the axle members 6 are mounted in a frame or casing 11 which is of substantial construction and adapted to receive a lubricant. The shafts 10 are connected to shafts 12 by means of universal couplings. Each of the shafts 12 has a bevel cog wheel 13 secured to its forward end, said cog wheel meshing with the teeth of a bevel pinion 14 secured to the inner end of a shaft 15. A friction disk 16 is secured to the inner end of each of the shafts 15 and is adapted to be engaged by the friction wheel 5. The shafts 12 and 15 are mounted in frames 17 which are transversely slidable in guides extending transversely of the main frame 1. Transverse movement of the frames 17 brings the friction disks 16 into engagement with the friction wheel 5 or causes them to clear the said friction wheel. The frames 17 are arranged upon opposite sides of the drive shaft 4, thereby bringing the friction disks 16 upon opposite sides of the friction wheel 5. Inward movement of the frames 17 causes the friction disks 16 to engage with opposite sides of the friction wheel 5. It is observed that the pressure of one friction disk upon the friction wheel 5 is neutralized by the pressure of the other friction disk upon the opposite side of the friction wheel.

Each of the frames 17 is adapted to be moved by means of a toggle joint, two being provided for each frame and the knuckles being connected to a rod 18. The toggles are indicated at 19. A sectional rock shaft 20 is arranged transversely of the frame 1 and each section has two arms 21 and 22 extending upwardly therefrom. A foot lever 23 is connected by means of a link 24 with each of the arms 22, the two foot levers being so arranged as to be operated in unison or separately. When both frames 17 are to be moved inwardly at the same time both foot levers 23 are pressed upon by the same foot or if preferred a foot may engage each of the levers 23. The rods or connections 18 are attached to the arms 21. When the rock shaft 20 is turned forwardly the toggles 19 are straightened, thereby forcing the frames 17 inwardly so as to bring the friction disks 16 into positive engagement with the friction wheel 5 with a degree of pressure to prevent slipping.

The friction wheel 5 has a hub in which is formed an annular groove to receive the fork of a shipper 24. A rock shaft 25 arranged parallel with the rock shaft 20 has arms 26 and 27, the arm 26 having connection with the shipper 24 and the arm 27 having connection with an arm 28 of a rock shaft 29, which latter is arranged parallel with the rock shafts 20 and 25 and has an operating lever 30 at its outer end. Movement of the lever 30 causes a rocking of the shafts 25 and 29 and a movement of the friction wheel 5 on the drive shaft 4, thereby bringing said friction wheel at a greater or less distance from the axis of the friction disks 16 whereby any desired speed within the diameter of the friction disks may be attained.

It is to be understood that the foot levers 23 and the operating lever 30 are provided with any means generally employed for holding like parts in an adjusted position. By having two friction disks and two sets of power transmitting devices it is possible to operate the machine in the event of one or the other of the power transmitting means becoming disabled. Moreover, the two sets results in an equalization of the power and strain which is of material advantage from a point of durability and smoothness of operation. The speed of the machine may be varied without disconnecting the drive axle from the motor, it being necessary only to operate the lever 30 to move the friction wheel 5 between the friction disks to a greater or less distance from the axis of said friction disks, as will be readily understood. By operating both foot levers 23 the frames 17 may be thrown outwardly, thereby disconnecting the drive axle from the motor which performs the same office as the clutch generally provided for this purpose. By operating one or the other of the foot levers one of the sections or members of the drive axle may be disconnected, with the result that the machine may be turned in a small space, since only one of the drive wheels is driven. When both frames 17 are pressed inwardly the drive shaft 4 is relieved from all lateral strain, hence there is no lateral stress to be overcome and there is no tendency to deflect the drive shaft between its bearings.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In propelling mechanism of the character described, the combination of a drive shaft, a friction wheel slidingly mounted upon the drive shaft to rotate therewith, a friction disk, a frame supporting the friction disk and mounted to move toward and away from the drive shaft, a power transmitting shaft geared to the said friction disk and having a portion mounted in the said movable frame, a drive axle, and gearing between the drive axle and power transmitting shaft.

2. In propelling mechanism of the character set forth, the combination of a drive shaft, a friction wheel keyed upon the drive shaft to rotate therewith and free to slide thereon, means for moving the friction wheel to an adjusted position, a friction disk arranged to engage with the friction wheel, a frame supporting the friction disk and movable toward and away from the drive shaft, toggles connecting the movable frame with a fixed frame, operating means for the toggles for moving said frame toward or away from the drive shaft, a power transmitting shaft geared with the said friction disk, a drive axle, and gearing between the drive axle and power transmitting shaft.

3. Propelling mechanism of the character substantially as set forth, the same comprising a drive shaft, a friction wheel rotatable with and movable on the drive shaft, a friction disk arranged to make contact with the friction wheel, a frame supporting the friction disk and movable toward and away from the drive shaft, toggles connecting the movable frame with a fixed frame, a rock shaft, connecting means between the rock shaft and knuckles of the toggles, an operating lever having connection with the rock shaft, a power transmitting shaft geared with the friction disk and having a portion mounted in the movable frame, a drive axle, and gearing connecting the drive axle with the power transmitting shaft.

4. In vehicle propelling mechanism, the combination of a drive shaft, a friction wheel keyed upon the drive shaft and movable thereon, oppositely disposed frames, friction disks mounted upon the frames, operating means for moving the frames toward or away from the drive shaft, said operating means embodying two levers arranged to be operated in unison or separately, a power transmitting shaft for each friction disk and geared thereto, a drive axle embodying two members and gearing connecting each of the members of the drive axle with a power transmitting shaft.

5. Propelling mechanism of the character specified, the same comprising a drive shaft, a friction wheel mounted upon the drive shaft to rotate therewith and free to move thereon, means for moving the friction wheel, oppositely disposed frames, friction disks mounted upon said frames, shafts mounted in the frames parallel with the drive shaft, bevel gearing connecting said shafts with the friction disks, other shafts connected by universal joints with the shafts mounted in the movable frames, a sectional drive axle, short shafts connected by means of universal joints with the shafts coupled to the shafts mounted in the movable frames, cog gearing connecting the short shafts with the sections of the drive axle, toggles connecting the movable frames with the main frame, a sectional rock shaft having its sections connected with the toggles of the respective frames, and operating levers for actuating the sections of the rock shaft and adapted to be actuated in unison or separately.

In testimony whereof I affix my signature in presence of two witnesses.

SAMUEL L. SLAUGHTER.

Witnesses:
JAMES L. FARRER, Jr.,
RUSSELL D. FARRIS.

Copies of this patent may be obtained for five cents each, by addressing the "Commissioner of Patents, Washington, D. C."